United States Patent
Ge

(10) Patent No.: US 10,764,829 B2
(45) Date of Patent: Sep. 1, 2020

(54) METHOD, DEVICE AND SYSTEM FOR REDUCING POWER CONSUMPTION OF MOBILE TERMINAL

(71) Applicant: Beijing Xiaomi Mobile Software Co., Ltd., Beijing (CN)

(72) Inventor: Weiyan Ge, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/146,718

(22) Filed: Sep. 28, 2018

(65) Prior Publication Data
US 2019/0104469 A1 Apr. 4, 2019

(30) Foreign Application Priority Data
Sep. 30, 2017 (CN) .......................... 2017 1 0914586

(51) Int. Cl.
*H04W 52/02* (2009.01)

(52) U.S. Cl.
CPC ... *H04W 52/0277* (2013.01); *H04W 52/0212* (2013.01); *H04W 52/0216* (2013.01); *H04W 52/0235* (2013.01); *Y02D 70/00* (2018.01); *Y02D 70/10* (2018.01); *Y02D 70/12* (2018.01); *Y02D 70/122* (2018.01)

(58) Field of Classification Search
None
See application file for complete search history.

(56) References Cited

U.S. PATENT DOCUMENTS

| 9,253,729 | B1 | 2/2016 | Sundar et al. |
| 9,473,209 | B2* | 10/2016 | Cooper ................... H02J 5/005 |
| 2007/0291673 | A1* | 12/2007 | Demirhan ......... H04W 52/0216 370/311 |
| 2013/0308511 | A1 | 11/2013 | Ljung |

(Continued)

FOREIGN PATENT DOCUMENTS

| CN | 101860948 A | 10/2010 |
| CN | 105848262 A | 8/2016 |
| CN | 107172690 A | 9/2017 |

OTHER PUBLICATIONS

Extended European Search Report dated Jan. 23, 2019 in Patent Application No. 18198006.1, 9 pages.

(Continued)

*Primary Examiner* — Joseph A Bednash
(74) *Attorney, Agent, or Firm* — Oblon, McClelland, Maier & Neustadt, L.L.P.

(57) ABSTRACT

The present disclosure relates to a method, a device and a system for reducing power consumption of a mobile terminal. The method includes sending a parameter adjustment request to an access network device connected to the mobile terminal in response to an instruction for reducing power consumption; receiving a parameter adjustment instruction sent by the access network device, wherein the parameter adjustment instruction includes a communication parameter to be adjusted, and the communication parameter to be adjusted is a baseband-chip related communication parameter; and adjusting the baseband-chip related communication parameter in the mobile terminal based on the parameter adjustment instruction to reduce the power consumption of the mobile terminal.

18 Claims, 12 Drawing Sheets

(56) References Cited

U.S. PATENT DOCUMENTS

2014/0119255 A1* 5/2014 Vannithannby ........ H04B 15/00
                                                    370/311
2015/0304955 A1  10/2015 Manepalli et al.
2016/0295447 A1* 10/2016 Braun .................. H04B 7/0426

OTHER PUBLICATIONS

Combined Chinese Office Action and Search Report dated Jun. 14, 2019 in Patent Application No. 201710914586.6 (with English translation of Categories of Cited Documents), 9 pages.

* cited by examiner

METHOD, DEVICE AND SYSTEM FOR REDUCING POWER CONSUMPTION OF MOBILE TERMINAL

CROSS-REFERENCE TO RELATED APPLICATIONS

This application is based upon and claims priority to Chinese Patent Application No. 201710914586.6, filed Sep. 30, 2017, the entire contents of which are incorporated herein by reference.

TECHNICAL FIELD

The present disclosure relates to the field of electronic technology, and more particularly, to a method, a device and a system for reducing power consumption of a mobile terminal.

BACKGROUND

With the development of science and technology, the functions of mobile terminals are becoming more processor intensive and more diverse. Correspondingly, the power consumption of mobile terminals is also increasing.

When a battery of a mobile terminal is running low, a method for reducing power consumption of the mobile terminal generally includes: changing a parameter of a peripheral device of the mobile terminal (for example, lowering brightness of the screen or decreasing volume of the speaker); reducing the number of the Central Processing Unit (CPU for short) cores of the mobile terminal; or, cleaning up application programs running in the background of the mobile terminal.

However, the above method for reducing power consumption of a mobile terminal has a poor performance in reducing power consumption of a mobile terminal.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for reducing power consumption of a mobile terminal, the method being applied to a mobile terminal. The method includes sending a parameter adjustment request to an access network device connected to the mobile terminal in response to an instruction for reducing power consumption; receiving a parameter adjustment instruction sent by the access network device, wherein the parameter adjustment instruction includes a communication parameter to be adjusted, and the communication parameter to be adjusted is a baseband-chip related communication parameter; and adjusting the baseband-chip related communication parameter in the mobile terminal based on the parameter adjustment instruction to reduce the power consumption of the mobile terminal.

According to an aspect, the method also includes detecting a battery level of the mobile terminal; and generating the instruction for reducing the power consumption when the battery level of the mobile terminal is less than a first power threshold, wherein sending the parameter adjustment request to the access network device comprises periodically sending the parameter adjustment request to the access network device while the battery level of the mobile terminal is less than the first power threshold, and continuing to send the parameter adjustment request until the battery level of the mobile terminal is greater than or equal to the first power threshold.

According to another aspect, after adjusting the baseband-chip related communication parameter in the mobile terminal, the method includes, when receiving a parameter restoring instruction sent by the access network device, restoring the baseband-chip related communication parameter in the mobile terminal based on the parameter restoring instruction, wherein the parameter restoring instruction is sent by the access network device upon expiration of a preset time period from when the access network device sends the parameter adjustment instruction.

According to yet another aspect, after adjusting the baseband-chip related communication parameter in the mobile terminal, the method includes, upon expiration of a preset time period from when the parameter adjustment instruction is received, restoring the baseband-chip related communication parameter in the mobile terminal, wherein the preset time period is included in the parameter adjustment instruction and instructs the restoration of the communication parameter.

According to yet another aspect, after adjusting the baseband-chip related communication parameter in the mobile terminal, the method includes, when detecting that a battery level of the mobile terminal is greater than a second power threshold, sending a parameter restoring request to the access network device, wherein the second power threshold is larger than or equal to the first power threshold; receiving a parameter restoring instruction sent by the access network device, wherein the parameter restoring instruction is sent by the access network device after the access network device receives the parameter restoring request; and restoring the baseband-chip related communication parameter in the mobile terminal based on the parameter restoring instruction.

In an example, the parameter adjustment request includes at least one of battery level information of the mobile terminal and a communication parameter to be adjusted by the mobile terminal, and the baseband-chip related communication parameter in the mobile terminal includes at least one of a number of operable antennas, a carrier aggregation function, a multiple-input multiple-output parameter, a throughput rate of the mobile terminal, and/or a communication protocol version.

Aspects of the disclosure also provide a method for reducing power consumption of a mobile terminal, the method being applied to an access network device. The method includes receiving a parameter adjustment request sent by a mobile terminal connected to the access network device; generating a parameter adjustment instruction based on the parameter adjustment request, wherein the parameter adjustment instruction includes a communication parameter to be adjusted, and the communication parameter to be adjusted is a baseband-chip related communication parameter; and sending the parameter adjustment instruction to the mobile terminal, wherein the parameter adjustment instruction instructs the mobile terminal to adjust the baseband-chip related communication parameter in the mobile terminal to reduce the power consumption of the mobile terminal.

According to an aspect, the parameter adjustment request includes battery level information of the mobile terminal, and, when generating the parameter adjustment instruction based on the parameter adjustment request, the method includes determining, based on the battery level information, a communication parameter to be adjusted from baseband-chip related communication parameters in the mobile terminal, wherein a number of the baseband-chip related communication parameters to be adjusted is inversely proportional to a battery level indicated by the battery level information; and generating the parameter adjustment instruction based on the communication parameter to be adjusted.

According to another aspect, when receiving the parameter adjustment request sent by the mobile terminal, the method includes receiving parameter adjustment requests sent by multiple mobile terminals. When generating the parameter adjustment instruction based on the parameter adjustment request, the method includes sequentially generating a parameter adjustment instruction for each of the mobile terminals based on an order of battery levels of the multiple mobile terminals. When sending the parameter adjustment instruction to the mobile terminal, the method includes sequentially sending the parameter adjustment instruction to each of the mobile terminals based on the order of battery levels of the multiple mobile terminals.

In an example, the parameter adjustment request includes battery level information of the mobile terminal, and, when generating the parameter adjustment instruction based on the parameter adjustment request, the method includes, when a battery level indicated by the battery level information is less than a third power threshold, determining an adjustment frequency band, wherein the adjustment frequency band allows a communication quality higher than that of the current communication frequency band of the mobile terminal; and generating the parameter adjustment instruction based on the adjustment frequency band, wherein the parameter adjustment instruction also instructs the mobile terminal to adjust the communication frequency band to the adjustment frequency band.

According to yet another aspect, after sending the parameter adjustment instruction to the mobile terminal, the method includes sending a parameter restoring instruction to the mobile terminal upon expiration of a preset time period from when the parameter adjustment instruction is sent to the mobile terminal, wherein the parameter restoring instruction instructs the mobile terminal to restore the baseband-chip related communication parameter.

According to yet another aspect, after sending the parameter adjustment instruction to the mobile terminal, the method includes sending a parameter restoring instruction to the mobile terminal when a parameter restoring request sent by the mobile terminal is received.

According to yet another aspect, after sending the parameter adjustment instruction to the mobile terminal, the method includes sending a parameter restoring instruction to the mobile terminal when detecting that a battery level of the mobile terminal increased by a value greater than a preset threshold.

Aspects of the disclosure also provide a mobile terminal including a processor and a memory for storing instructions executable by the processor. The processor is configured to send a parameter adjustment request to an access network device connected to the mobile terminal in response to an instruction for reducing power consumption; receive a parameter adjustment instruction sent by the access network device, wherein the parameter adjustment instruction includes a communication parameter to be adjusted, and the communication parameter to be adjusted is a baseband-chip related communication parameter; and adjust the baseband-chip related communication parameter in the mobile terminal based on the parameter adjustment instruction to reduce the power consumption of the mobile terminal.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

FIG. 5-1 is a block diagram illustrating a device for reducing power consumption of a mobile terminal according to an exemplary aspect of the present disclosure;

FIG. 5-2 is a block diagram illustrating another device for reducing power consumption of a mobile terminal according to an exemplary aspect of the present disclosure;

FIG. 5-3 is a block diagram illustrating yet another device for reducing power consumption of a mobile terminal according to an exemplary aspect of the present disclosure;

FIG. 6-1 is a block diagram illustrating still another device for reducing power consumption of a mobile terminal according to an exemplary aspect of the present disclosure;

FIG. 6-2 is a block diagram illustrating a generating module according to an exemplary aspect of the present disclosure;

FIG. 6-3 is a block diagram illustrating a sending module according to an exemplary aspect of the present disclosure;

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure.

Instead, they are merely examples of apparatuses and methods consistent with aspects related to the disclosure as recited in the appended claims.

Figure 1:
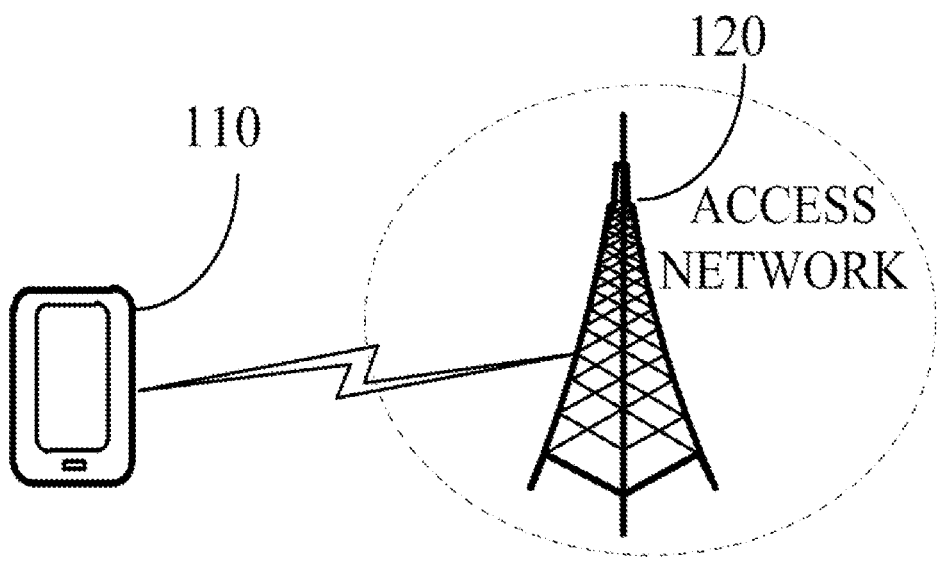
FIG. 1 is a schematic diagram illustrating an implementation environment involved in a method for reducing power consumption of a mobile terminal according to an exemplary aspect of the present disclosure.

FIG. 1 is a schematic diagram of an implementation environment involved in a method for reducing power consumption of a mobile terminal according to an exemplary aspect. The implementation environment may include: a mobile terminal 110 and an access network device 120. The mobile terminal 110 may be a smartphone, a tablet computer, a multimedia player, an e-reader, a wearable device, or the like. The mobile terminal 110 may be connected to an access network through the access network device 120, and the access network may be a part of the telecommunication wide area network. After the mobile terminal is connected to the access network, the mobile terminal 110 may obtain related services from the core network. The telecommunication wide area network can support different standard communication systems. For example, the communication system may be a Long Term Evolution (LTE) system, a Time Division Synchronous Code Division Multiple Access (TD-SCDMA) System or a Wideband Code Division Multiple Access (WCDMA) system. In the LTE system, the access network device 120 may be an evolved NodeB (eNodeB); and in the TD-SCDMA or WCDMA systems, the access network device 120 may be a radio network controller (RNC).

Figure 2:
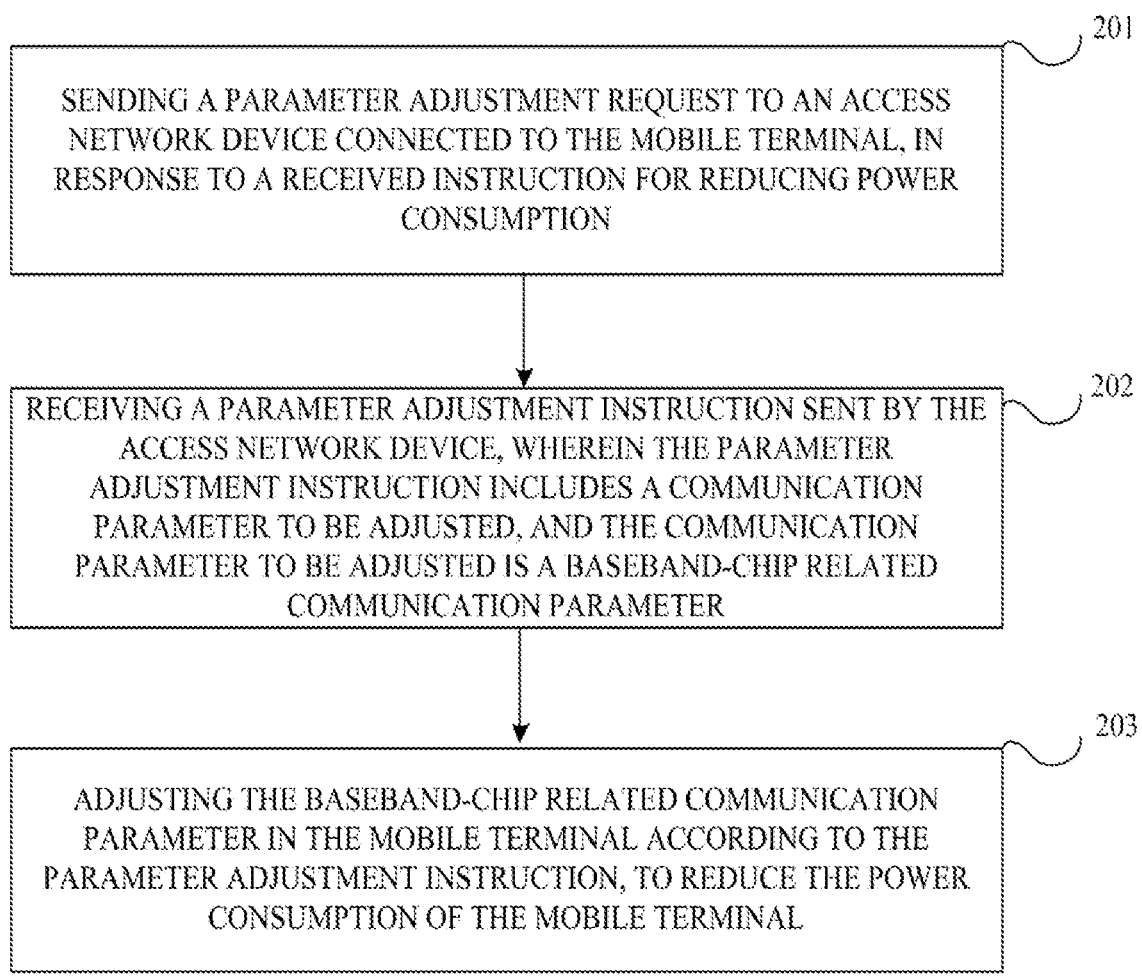
FIG. 2 is a flow chart illustrating a method for reducing power consumption of a mobile terminal according to an exemplary aspect of the present disclosure.

FIG. 2 is a flowchart illustrating a method for reducing power consumption of a mobile terminal according to an exemplary aspect. The method may be applied to the mobile terminal 110 shown in FIG. 1. As shown in FIG. 2, the method may include the following steps.

In Step 201, a parameter adjustment request is sent to an access network device connected to the mobile terminal, in response to a received instruction for reducing power consumption.

The instruction for reducing power consumption may be triggered automatically by the mobile terminal according to a battery level of the mobile terminal, or may be initiated by a user actively.

In Step 202, a parameter adjustment instruction sent by the access network device is received, the parameter adjustment instruction includes a communication parameter to be adjusted, and the communication parameter to be adjusted is a baseband-chip related communication parameter.

The baseband-chip related communication parameter may include at least one of a number of operable antennas, a carrier aggregation function, a multiple-input multiple-output parameter, a throughput rate of the mobile terminal, and a communication protocol version.

In Step 203, the baseband-chip related communication parameter in the mobile terminal is adjusted according to the parameter adjustment instruction, to reduce the power consumption of the mobile terminal.

Due to the large power consumption of the baseband chip in the mobile terminal, reducing the power consumption of the baseband chip can effectively reduce the power consumption of the mobile terminal.

Accordingly, in the method for reducing power consumption of a mobile terminal provided by the aspect of the present disclosure, the mobile terminal may send a parameter adjustment request to an access network device connected to the mobile terminal when receiving an instruction for reducing power consumption, and may adjust a baseband-chip related communication parameter according to a parameter adjustment instruction sent by the access network device, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figure 3:
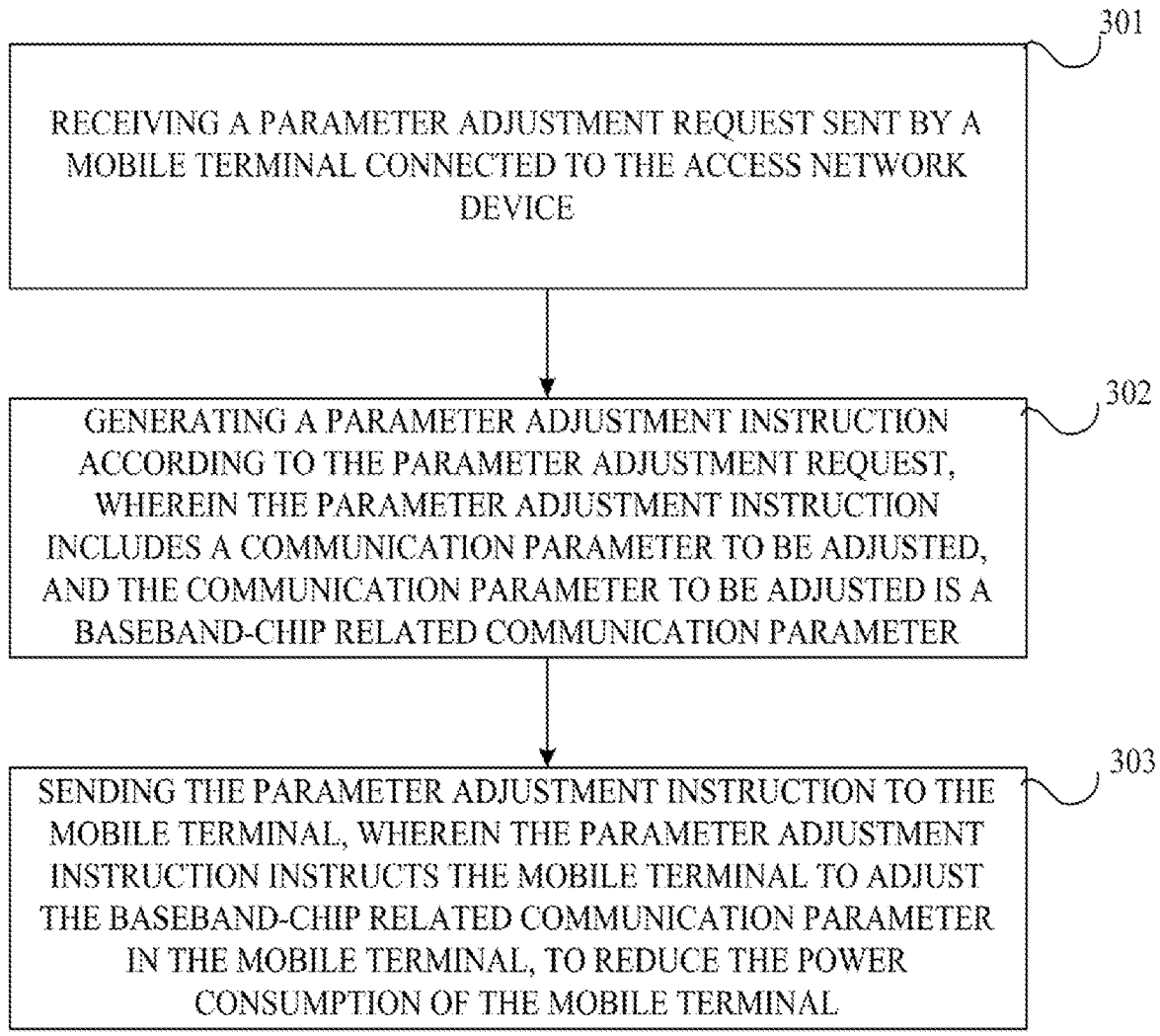
FIG. 3 is a flow chart illustrating another method for reducing power consumption of a mobile terminal according to an exemplary aspect of the present disclosure.

FIG. 3 is a flow chart illustrating another method for reducing power consumption of a mobile terminal according to an exemplary aspect. The method may be applied to the access network device 120 shown in FIG. 1. As shown in FIG. 3, the method may include the following steps.

In step 301, a parameter adjustment request sent by a mobile terminal connected to the access network device is received.

The parameter adjustment request may be sent when the mobile terminal receives an instruction for reducing power consumption.

In step 302, a parameter adjustment instruction is generated according to the parameter adjustment request, the parameter adjustment instruction includes a communication parameter to be adjusted, and the communication parameter to be adjusted is a baseband-chip related communication parameter.

The baseband-chip related communication parameter may include at least one of a number of operable antennas, a carrier aggregation function, a multiple-input multiple-output parameter, a throughput rate of the mobile terminal, and a communication protocol version.

In step 303, the parameter adjustment instruction is sent to the mobile terminal, and the parameter adjustment instruction instructs the mobile terminal to adjust the baseband-chip related communication parameter in the mobile terminal, to reduce the power consumption of the mobile terminal.

Accordingly, in the method for reducing power consumption of a mobile terminal provided by the aspect of the present disclosure, when receiving a parameter adjustment request sent by a mobile terminal connected thereto, the access network device may send a parameter adjustment instruction to the mobile terminal. The mobile terminal may adjust a baseband-chip related communication parameter according to the parameter adjustment instruction, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figure 4:
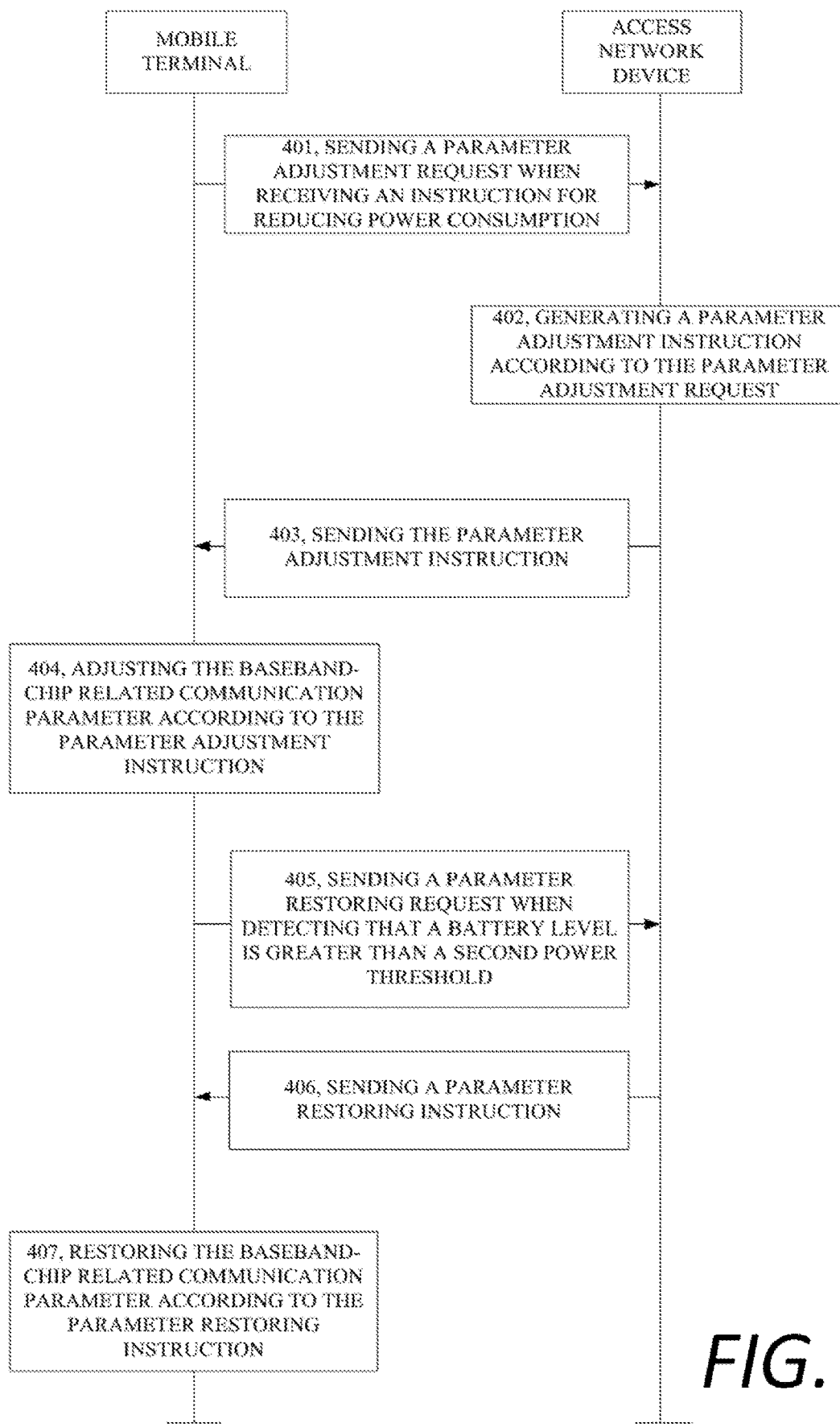
FIG. 4 is a flow chart illustrating yet another method for reducing power consumption of a mobile terminal according to an exemplary aspect of the present disclosure.

FIG. 4 is a flow chart illustrating yet another method for reducing power consumption of a mobile terminal according to an exemplary aspect. The method may be applied in the implementation environment as shown in FIG. 1. As shown in FIG. 4, the method may include the following steps.

In Step 401, when receiving an instruction for reducing power consumption, the mobile terminal sends a parameter adjustment request to an access network device connected thereto.

Since the power consumption of the baseband chip in the mobile terminal is relatively high, when the mobile terminal receives the instruction for reducing power consumption, the mobile terminal can reduce the power consumption of the baseband chip by adjusting a baseband-chip related communication parameter. Further, since the access network device exchanges data with the mobile terminal according to a communication parameter reported by the mobile terminal, the mobile terminal is required to send the parameter adjustment request to the access network device connected thereto before the mobile terminal adjusts the communication parameter.

In an aspect of the present disclosure, on the one hand, the instruction for reducing power consumption may be triggered by the mobile terminal according to a battery level of the mobile terminal. For example, the mobile terminal may detect its battery level in real time or periodically. When the mobile terminal detects that its battery level falls below a first power threshold, the mobile terminal may trigger the instruction for reducing power consumption. Alternatively, the mobile terminal may also determine a usable duration of the current battery level according to the current battery level and the current power consumption of the system in the mobile terminal. When the usable duration is less than a usable duration threshold, the mobile terminal may trigger the instruction for reducing power consumption. The first power threshold and the usable duration threshold may be previously configured in the mobile terminal or may be set by the user autonomously, which is not limited in the aspect of the present disclosure.

On the other hand, the instruction for reducing power consumption may also be triggered by the user actively. When the user wishes to reduce the power consumption of the mobile terminal, the user may trigger the instruction for reducing power consumption by a preset operation, which may be a click operation, a slide operation or a voice operation, etc., which is not limited in the aspect of the present disclosure.

As an example, it is assumed that the instruction for reducing power consumption is triggered by the mobile terminal according to the battery level of the mobile terminal, and the first power threshold is 20%. When the mobile terminal detects that the battery level of the mobile terminal is less than 20%, the mobile terminal may trigger the instruction for reducing power consumption. Alternatively, when the user wishes to reduce the power consumption of the mobile terminal, the user may trigger the mobile terminal to display a power management interface through a click operation (for example, clicking an icon for setup), and the power management interface may display an icon of a power saving mode switch. When the user performs a click operation on the icon of the power saving mode switch, the mobile terminal may receive the instruction for reducing power consumption triggered by the user.

Further, the parameter adjustment request sent by the mobile terminal to the access network device may include at least one of battery level information of the mobile terminal and a communication parameter to be adjusted by the mobile terminal. The battery level information of the mobile terminal may include any one of a low battery notification message (the low battery notification message may be used to notify the access network device that the current battery level of the mobile terminal is low), a current remaining battery capacity of the mobile terminal, or a usable duration of the current battery capacity determined by the mobile terminal according the current battery capacity and the current power consumption of the system in the mobile terminal. The communication parameter to be adjusted in the mobile terminal may be determined by the mobile terminal from its baseband-chip related communication parameters. The baseband-chip related communication parameters of the mobile terminal may include at least one of a number of operable antennas, a carrier aggregation function, a multiple-input multiple-output parameter, a throughput rate of the mobile terminal, and a communication protocol version.

The number of operable antennas refers to the number of antennas that can be used to receive and send data (i.e., in an operation state) among a plurality of antennas that are preset in the mobile terminal. The carrier aggregation function refers to the function that the mobile terminal aggregates multiple carriers to improve data transmission rate and bandwidth. When the mobile terminal enables the carrier aggregation function, the data transmission rate and the bandwidth of the baseband chip may be greatly increased. The multiple-input multiple-output parameter refers to the number of data streams that the operable antennas can send and receive when data is exchanged between the mobile terminal and the access network device. The throughput rate of the mobile terminal refers to, when the mobile terminal performs data exchange with the access network device, an average rate of data passing through each communication channel or each node per unit time. The throughput rate may be divided into different categories according to the magnitude of the throughput rate. The smaller the throughput rate of the mobile terminal is, the lower the corresponding throughput rate category is. The communication protocol version refers to a release version of the communication protocol based on which the mobile terminal and the access network device perform data exchange. The higher the version of the communication protocol is, the stronger the communication capability of the baseband chip is.

It should be noted that, in practical applications, each access network device may perform data interaction with multiple mobile terminals. When an access network device receives parameter adjustment requests sent by multiple mobile terminals, the access network device may sequentially responds to the parameter adjustment requests sent by the multiple mobile terminals. In order to prevent the access network device from omitting a response to a certain mobile terminal, the mobile terminal may periodically send a parameter adjustment request to the access network device while its battery level is less than the first power threshold, to constantly remind the access network device that the mobile terminal has a low battery level and needs to adjust the communication parameter to reduce the power consumption of the baseband chip. In addition, periodically sending the parameter adjustment request to the access network device by the mobile terminal may also allow the access network device to learn about the real-time battery level of the mobile terminal, such that the access network device may send a corresponding instruction (such as a parameter restoring instruction) according to variation of the battery level of the mobile terminal to adjust the baseband-chip related communication parameter in the mobile terminal in real time. When the battery level of the mobile terminal is greater than or equal to the first power threshold, the mobile terminal may stop sending the parameter adjustment request.

In Step 402, the access network device generates a parameter adjustment instruction according to the parameter adjustment request.

After the access network device receives the parameter adjustment request sent by the mobile terminal connected thereto, the access network device may generate a parameter adjustment instruction according to the parameter adjustment request. The parameter adjustment instruction may include a communication parameter to be adjusted, and the communication parameter to be adjusted is a baseband-chip related communication parameter.

In the aspect of the present disclosure, when the parameter adjustment request sent by the mobile terminal includes the battery level information of the mobile terminal, the access network device may determine the communication parameter to be adjusted according to the battery level information. The number of communication parameters to be adjusted is negatively related to the battery level indicated by the battery level information. That is, the lower the battery level of the mobile terminal is, the more the number of communication parameters to be adjusted is. Since when the mobile terminal was connected to the access network, the mobile terminal reported its baseband-chip related communication parameters to the access network device, when the access network device determines the communication parameter to be adjusted, the access network device may directly determine it from the communication parameters reported by the mobile terminal when the mobile terminal was connected to the access network.

As an example, the access network device may pre-store a correspondence between the battery level of the mobile terminal and the number of communication parameters to be adjusted as shown in Table 1. As can be seen from Table 1, When the battery level of the mobile terminal is within the interval (15%, 20%], the access network device may determine that the number of communication parameters to be adjusted is one. When the battery level of the mobile terminal is within the interval (0%, 5%], the access network device may determine that the number of baseband-chip related communication parameters to be adjusted is five.

TABLE 1

| battery level of the mobile terminal | number of communication parameters to be adjusted |
| --- | --- |
| (15%, 20%] | one |
| (10%, 15%] | two |
| (5%, 10%] | four |
| [0, 5%] | five |

Further, after the access network device determines that the number of the baseband-chip related communication parameters to be adjusted is N, the access network device may further determine the specific communication parameters to be adjusted and the adjustment magnitude of the communication parameters to be adjusted. When determining the communication parameters to be adjusted, on the one hand, the access network device may randomly determine N communication parameters from the baseband-chip related communication parameters in the mobile terminal. On the other hand, the access network device may also determine the specific communication parameters to be adjusted according to the power consumption of the communication capability corresponding to each communication parameter. For example, the access network device may sort the communication parameters according to the power consumption of the communication capability corresponding to the communication parameters in a high to low order, and may select first N parameters with the highest power consumption from the sorted communication parameters, for the adjustment. That is, when the access network device selects the communication parameters to be adjusted, the access network device may select in priority the communication parameter with communication capacity corresponding to higher power consumption. The power consumption of each communication parameter may be reported by the mobile terminal, or may be pre-stored in the access network device, or may also be calculated by the access network device according to the battery level information and communication parameters reported by multiple mobile terminals, which is not limited by the aspect of the present disclosure.

When determining the adjustment magnitude of the communication parameter to be adjusted, the access network device may determine it according to the battery level information of the mobile terminal. The adjustment magnitude of the communication parameter to be adjusted may be negatively related to the battery level indicated by the battery level information. That is, the lower the battery level of the mobile terminal is, the greater the adjustment magnitude of each communication parameter to be adjusted will be.

As an example, it is assumed that when the mobile terminal was connected to the access network, the mobile terminal reported to the access network device the following baseband-chip related communication parameters: the number of operable antennas is 4, the carrier aggregation function of the mobile terminal is enabled, the number of the data streams sent and received by the 4 operable antennas is 4, the throughput rate category is 4, and the communication protocol version is release 14 (i.e., the release version of the communication protocol is the 14th version). The order of power consumption of the communication parameters from high to low is as follows: the number of operable antennas, the carrier aggregation function, the multiple-input multiple-output parameter, the throughput rate of the mobile terminal, and the communication protocol version.

If the battery level indicated by the battery level information included in the parameter adjustment request sent by the mobile terminal and received by the access network device is 18%, the access network device may determine that the number of communication parameters to be adjusted is one, according to the correspondence shown in Table 1. Further, the access network device may determine that the communication parameter to be adjusted according to the high-to-low order of the power consumption of the communication capability respectively corresponding to the communication parameters is the number of operable antennas, and determine that the adjustment magnitude of the number of operable antennas according to the battery level of the mobile terminal is 2. That is, the number of operable antennas is reduced from 4 to 2. Correspondingly, the parameter adjustment instruction generated by the access network device may include: the number of operable antennas is 2.

If the battery level indicated by the battery level information included in the parameter adjustment request received by the access network device is 8%, the access network device may determine that the number of communication parameters to be adjusted is four, according to the correspondence shown in Table 1. Afterwards, the network access device may determine the communication parameters to be adjusted according to the high-to-low order of the power consumption of the communication capability respectively corresponding to the communication parameters are: the number of operable antennas, the carrier aggregation function, the multiple-input multiple-output parameter, and the throughput rate of a mobile terminal. Further, the access network device may determine the adjustment magnitude of each communication parameter to be adjusted according to the battery level of the mobile terminal as follows: reducing the number of operable antennas from 4 to 1; disabling the carrier aggregation function; reducing the multiple-input multiple-output parameter, i.e., the number of data streams sent and received by the operable antennas from 4 to 1; and reducing the throughput rate of the mobile terminal from category 4 to category 2. Correspondingly, the parameter adjustment instruction generated by the access network device may include: the number of operable antennas is 1;

the carrier aggregation function is disabled; the multiple-input multiple-output parameter is 1; and the throughput rate of the mobile terminal is category 2.

It should be noted that in the aspect of the present disclosure, the mobile terminal may also determine the communication parameter to be adjusted in advance, and then send the parameter adjustment request to the access network device. In this case, the parameter adjustment request includes the communication parameter to be adjusted by the mobile terminal. After receiving the parameter adjustment request, the access network device may directly generate the parameter adjustment instruction according to the communication parameter to be adjusted carried in the parameter adjustment request. The specific process of the mobile terminal determining the communication parameters that need to be adjusted may refer to the above process of the access network device determining the communication parameter to be adjusted according to the battery level information of the mobile terminal, which is not described herein again.

It should also be noted that when receiving the parameter adjustment request including battery level information, the access network device may further detect whether the battery level indicated by the battery level information is less than a preset third power threshold. If the battery level indicated by the battery level information is less than the third power threshold, the access network device may determine that the battery level of the mobile terminal is too low. In order to further reduce the power consumption of the mobile terminal, the access network device may further determine a new adjustment frequency band allowing a communication quality higher than that of the current communication frequency band of the mobile terminal. Afterwards, the access network device may generate a parameter adjustment instruction according to the frequency information of the new adjustment frequency band and send the parameter adjustment instruction to the mobile terminal, such that the mobile terminal may adjust the communication frequency band to the adjustment frequency band. Since the mobile terminal may have a better communication signal when performing data interaction with the access network device in the high-quality communication frequency band, it can further reduce the power consumption of the baseband chip. The third power threshold may be previously configured for the access network device, and the third power threshold may be less than the first power threshold.

In Step 403, the access network device sends a parameter adjustment instruction to the mobile terminal.

The parameter adjustment instruction instructs the mobile terminal to adjust the baseband-chip related communication parameter in the mobile terminal so as to reduce the power consumption of the baseband chip.

As an example, the communication parameter carried in the parameter adjustment instruction sent by the access network device to the mobile terminal may be: the number of operable antennas is 1; the carrier aggregation function is disabled; the multiple-input multiple-output parameter is 1; and the throughput rate of the mobile terminal is category 2.

It should be noted that, since each access network device may perform data interaction with multiple mobile terminals, when an access network device receives a parameter adjustment request sent by multiple mobile terminals, the access network device may, according to the order of the battery levels indicated by the battery level information included in the multiple parameter adjustment requests, sequentially generate a parameter adjustment instruction for each mobile terminal, and sequentially send the parameter adjustment instruction to each mobile terminal. That is, the access network device may respond to a parameter adjustment request sent by a mobile terminal with lower battery level in priority.

As an example, it is assumed that the access network device receives the parameter adjustment requests sent by a mobile terminal A, a mobile terminal B and a mobile terminal C at the same time. The battery level indicated by the battery level information carried in the parameter adjustment request sent by the mobile terminal A is 20%, the battery level indicated by the battery level information carried in the parameter adjustment request sent by the mobile terminal B is 10%, and the battery level indicated by the battery level information carried in the parameter adjustment request sent by the mobile terminal C is 12%. Then, according to the order of the battery levels of the three mobile terminals, the access network device may sequentially generate parameter adjustment instructions for the mobile terminal B, the mobile terminal C and the mobile terminal A, and sequentially send the parameter adjustment instructions respectively to the mobile terminal B, the mobile terminal C and the mobile terminal A.

In Step 404, the mobile terminal adjusts the baseband-chip related communication parameter in the mobile terminal according to the parameter adjustment instruction.

When receiving the parameter adjustment instruction, the mobile terminal may adjust its baseband-chip related communication parameter according to the parameter reduction instruction, to reduce the power consumption of the baseband chip.

As an example, according to the parameter adjustment instruction sent by the access network device, the mobile terminal may reduce the number of its operable antennas to 1, disable the carrier aggregation function, and reduce the multiple-input multiple-output parameter, i.e., the number of data streams sent and received by the operable antenna to 1, and reduce its throughput rate to category 2.

In Step 405, when the mobile terminal detects that its power level is greater than a second power threshold, the mobile terminal sends a parameter restoring request to the access network device.

After the mobile terminal receives the parameter adjustment instruction from the access network device and adjusts its baseband-chip related communication parameter, the mobile terminal may continue to detect its battery level. When the mobile terminal detects that the battery level of the mobile terminal is greater than the second power threshold, the mobile terminal may determine that the current battery level is relatively high, and can support the baseband chip to work with higher communication capabilities. In order to improve the user experience, the mobile terminal may send a parameter restoring request to the access network device. The second power threshold is greater than or equal to the first power threshold, and second power threshold may be previously configured in the mobile terminal or may be set by a user autonomously, which is not limited in the aspect of the present disclosure.

As an example, assuming that the second power threshold is 50%, when the mobile terminal detects that its current battery level is greater than 50% after receiving the parameter adjustment instruction from the access network device and adjusting its baseband-chip related communication parameter, the mobile terminal may send a parameter restoring request to the access network device.

In Step 406, the access network device sends a parameter restoring instruction to the mobile terminal.

After receiving the parameter restoring request, the access network device may send a parameter restoring instruction to the mobile terminal. The parameter restoring instruction instructs the mobile terminal to restore the baseband-chip related communication parameter.

On the one hand, the parameter restoring instruction may instruct the mobile terminal to restore its baseband-chip related communication parameter to the state before the adjustment.

On the other hand, when the parameter restoring request sent by the mobile terminal includes battery level information, the parameter restoring instruction may further include a communication parameter to be restored. The communication parameter to be restored may be determined by the access network device according to the battery level indicated by the battery level information. The number of and the restoring magnitude of communication parameters to be restored are positively related to the battery level indicated by the battery level information. That is, the higher the battery level indicated by the battery level information is, the larger the number of communication parameters to be restored is, and the larger the restoring magnitude is. When the access network device selects a communication parameter to be specifically restored, the access network device may select the communication parameter corresponding to the communication capability with lower power consumption in priority. The process of the access network device determining the communication parameter to be restored may refer to the above process of determining the communication parameter to be adjusted, which will not be described herein again.

As an example, assuming that the battery level indicated by the battery level information included in the parameter restoring request sent by the mobile terminal is 50%, the communication parameter to be restored as determined by the access network device according to the battery level may include: the number of operable antennas is 3, and the carrier aggregation function of the mobile terminal is enabled. Assuming that the battery level indicated by the battery level information included in the parameter restoring request sent by the mobile terminal is 60%, the communication parameter to be restored as determined by the access network device according to the battery level may include: the number of operable antennas is 4, the carrier aggregation function of the mobile terminal is enabled, and the multiple-input multiple-output parameter is 3.

It should be noted that, if in the above Step 401, the mobile terminal periodically sends a parameter adjustment request to the access network device when its battery level is less than the first power threshold, the access network device may, after the access network device sends the parameter adjustment instruction to the mobile terminal, continuously to detect the battery level indicated by the battery level information in the parameter adjustment request that is reported by the mobile terminal each time. When the access network device detects that the battery level of the mobile terminal is much greater than the battery level when the parameter adjustment instruction or the parameter restoring instruction was sent last time (for example, greater than a certain preset threshold), the access network device may generate a parameter restoring instruction according to the current battery level of the mobile terminal and send the parameter restoring instruction to the mobile terminal. Afterwards, the access network device may further continue to detect the battery level indicated by the battery level information in the parameter adjustment request reported by the mobile terminal, and continue to generate and send the parameter restoring instruction according to the change of the battery level of the mobile terminal.

As an example, assuming that the preset threshold is 5%, when the battery level indicated by the battery level information included in the parameter adjustment request sent by the mobile terminal for the first time is 5%, a corresponding parameter adjustment instruction generated by the access network device according to the request may be: the number of operable antennas is 2, the carrier aggregation function of the mobile terminal is disabled, the multiple-input multiple-output parameter is 1, the throughput rate of the mobile terminal is category 2, and the communication protocol version is release 8. When the battery level indicated by the battery level information included in the parameter adjustment request sent by the mobile terminal for the second time is 10%, since the battery level of the mobile terminal is increased by less than 5%, the access network device may not respond to the parameter adjustment request. When the battery level indicated by the battery level information included in the parameter adjustment request sent by the mobile terminal for the third time is 14%, since the battery level of the mobile terminal is increased by more than 5%, the access network device may generate a corresponding parameter restoring instruction according to the parameter adjustment request. The parameter restoring instruction may be: the throughput rate of the mobile terminal is category 4, and the communication protocol version is release 14. At this time, the un-restored communication parameters in the mobile terminal are: the number of operable antennas, the carrier aggregation function of the mobile terminal, and the multiple-input multiple-output parameter. When the battery level indicated by the battery level information included in the parameter adjustment request sent by the mobile terminal for the fourth time is 19.5%, the corresponding parameter restoring instruction generated by the access network device according to the request may be: the carrier aggregation function of the mobile terminal is enabled, and the multiple-input multiple-output parameter is 4.

In Step 407, the mobile terminal restores the baseband-chip related communication parameter according to the parameter restoring instruction.

When the parameter restoring instruction received by the mobile terminal does not include the communication parameter to be restored, the mobile terminal may directly restore its communication parameters to the states before the adjustment. As an example, the mobile terminal may restore the number of its operable antennas to 4, enable its carrier aggregation function, restore the multiple-input multiple-output parameter to 4, and restore its throughput rate to category 4.

When the parameter restoring instruction received by the mobile terminal includes the communication parameter to be restored, the mobile terminal may restore the communication parameter according to the parameter restoring instruction. As an example, it is assumed that the parameter restoring instruction received by the mobile terminal includes: the number of operable antennas is 4, the carrier aggregation function of the mobile terminal is enabled, and the multiple-input multiple-output parameter, i.e., the number of the data streams sent and received by the operable antennas is 3.

It should be noted that the manner in which the mobile terminal restores its baseband-related communication parameter may also be any one of the following three types.

As the first restoring manner, the mobile terminal automatically restores the baseband-chip related communication parameter to the state before the adjustment.

The parameter adjustment instruction received by the mobile terminal may further include a preset time period for instructing the restoration of the communication parameter. When the preset time period has passed since the parameter adjustment instruction sent by the access network device is received, the mobile terminal may automatically restore its baseband-chip related communication parameter to the state before adjustment. Since the preset time period is predetermined by the access network device, after the mobile terminal restores its communication parameter to the state before the adjustment, the access network device may correspondingly perform data exchange with the mobile terminal according to the communication parameter before the adjustment. Thereby, it can ensure the stability of data exchange between the mobile terminal and the access network device.

As an example, assuming that the preset time period is 15 minutes, the mobile terminal automatically restores the baseband-chip related communication parameter to the state before the adjustment, when 15 minutes has passed since the mobile terminal receives the parameter adjustment instruction sent by the access network device. Correspondingly, the access network device may automatically communicate with the mobile terminal according to the communication parameter reported when the mobile terminal was connected to the access network, when 15 minutes has passed since the access network device sends the parameter adjustment instruction.

As the second restoring manner, the access network device directly sends the parameter restoring instruction.

When the preset time period has passed since the access network device sends the parameter adjustment instruction to the mobile terminal, the access network device may directly send a parameter restoring instruction to the mobile terminal. After receiving the parameter restoring instruction sent by the access network device, the mobile terminal may adjust the corresponding communication parameter according to the parameter restoring instruction.

In both of the foregoing implementation manners, both of the mobile terminal and the access network device may be provided with a timer, and the mobile terminal and the access network device may count time according to the timer.

As the third restoring manner, the access network device forcibly sends the parameter restoring instruction.

Since each access network device may perform data exchange with multiple mobile terminals at the same time, when the power consumption of the baseband chip of one of the mobile terminals is in a low state for a long time, i.e., when the communication capability of the mobile terminal is poor, the network access device sends data to the mobile terminal more slowly and inefficiently, which may result in accumulation of data in the access network device and affect communication between the access network device and other mobile terminals. In this case, the access network device may forcibly send a parameter restoring instruction to the mobile terminal, so as to instruct the mobile terminal to adjust its communication parameter and improve its communication capability.

Accordingly, in the method for reducing power consumption of a mobile terminal provided by the aspect of the present disclosure, the mobile terminal may send a parameter adjustment request to an access network device connected to the mobile terminal when receiving an instruction for reducing power consumption, and may adjust a baseband-chip related communication parameter according to a parameter adjustment instruction sent by the access network device, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figures 1, 5:
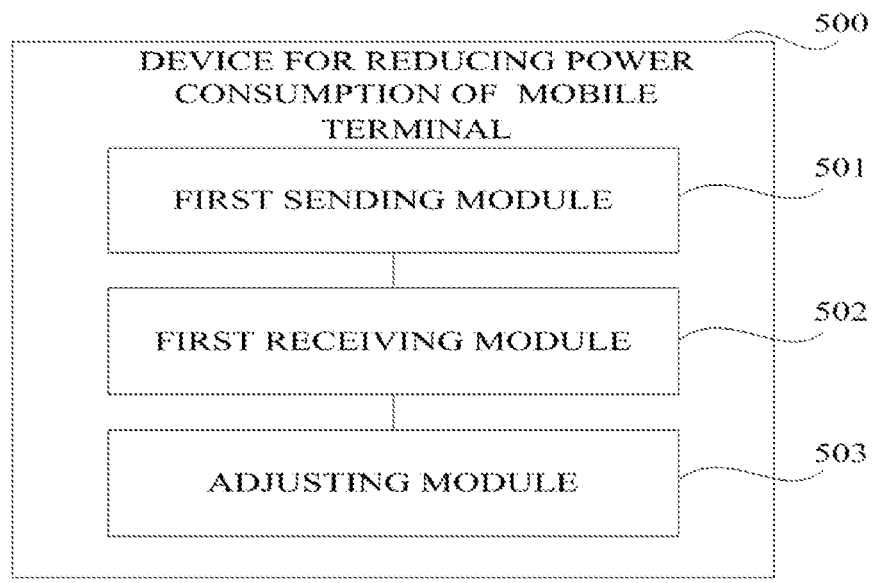
Figures 2, 5:
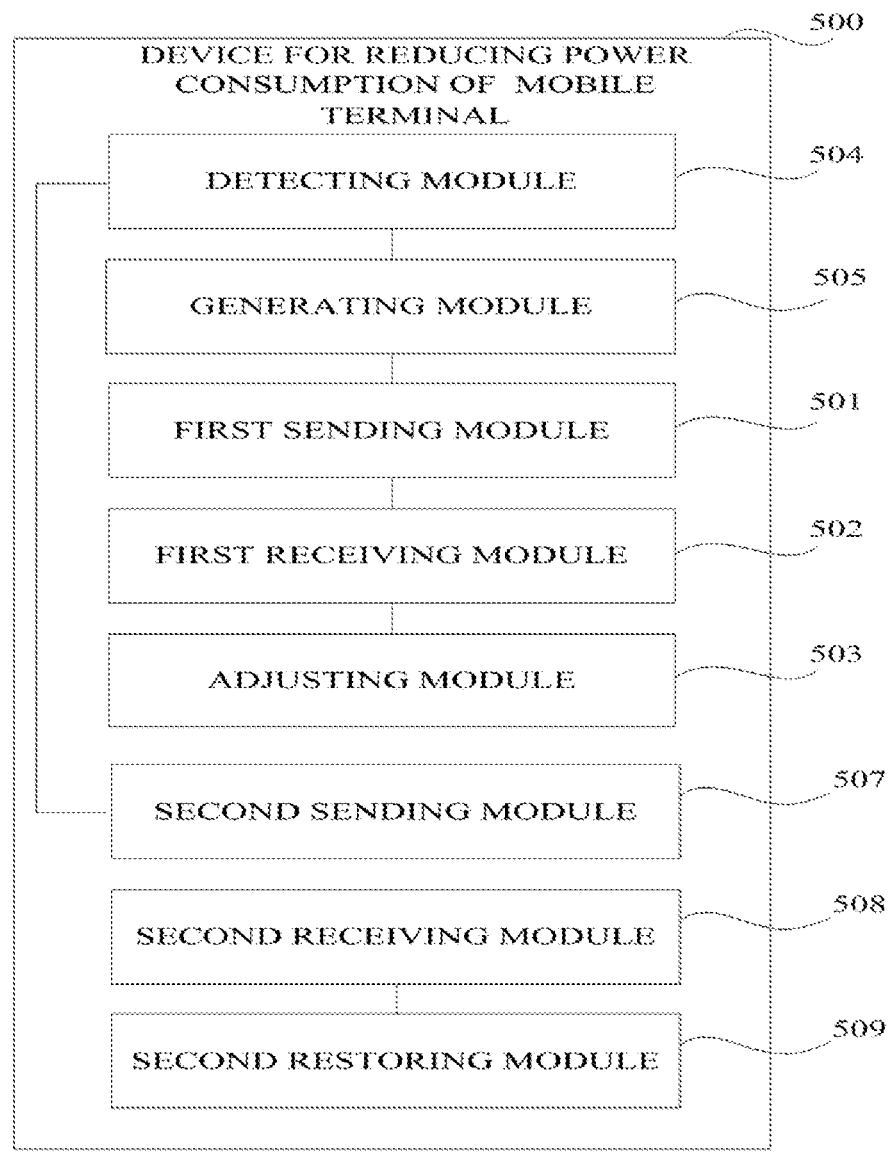
Figures 3, 5:
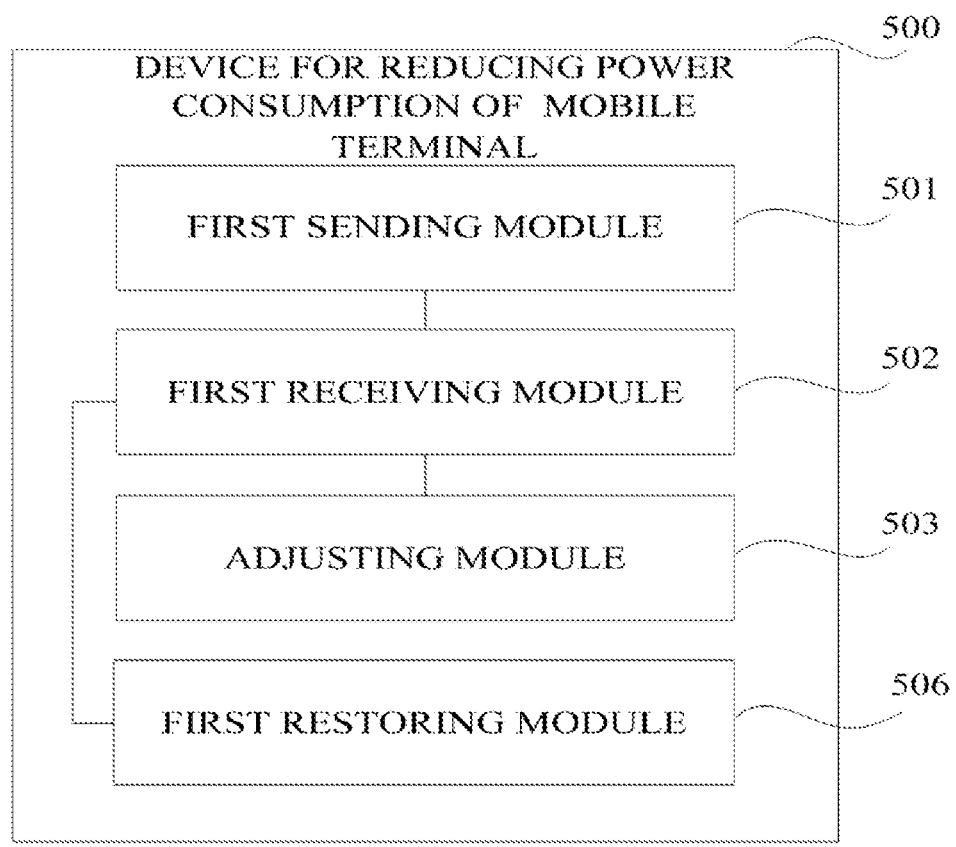

FIG. 5-1 is a block diagram illustrating a device 500 for reducing power consumption of a mobile terminal according to an exemplary aspect. The device may be configured in the mobile terminal 110 as shown in FIG. 1. As shown in FIG. 5-1, the device may include:

a first sending module 501 configured to send a parameter adjustment request to an access network device connected to the mobile terminal, in response to a received instruction for reducing power consumption;

a first receiving module 502 configured to receive a parameter adjustment instruction sent by the access network device, the parameter adjustment instruction including a communication parameter to be adjusted, and the communication parameter to be adjusted being a baseband-chip related communication parameter; and an adjusting module 503 configured to adjust the baseband-chip related communication parameter in the mobile terminal according to the parameter adjustment instruction, to reduce the power consumption of the mobile terminal.

Accordingly, in the device for reducing power consumption of a mobile terminal provided by the aspect of the present disclosure, the mobile terminal may send a parameter adjustment request to an access network device connected to the mobile terminal when receiving an instruction for reducing power consumption, and may adjust a baseband-chip related communication parameter according to a parameter adjustment instruction sent by the access network device, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

FIG. 5-2 is a block diagram illustrating another device 500 for reducing power consumption of a mobile terminal according to an exemplary aspect. As shown in FIG. 5-2, the device further includes:

a detecting module 504 configured to detect a battery level of the mobile terminal; and a generating module 505 configured to generate the instruction for reducing power consumption when the battery level of the mobile terminal is less than a first power threshold.

The first sending module 501 includes:

a first sending sub-module 5011 configured to periodically send the parameter adjustment request to the access network device while the battery level of the mobile terminal is less than the first power threshold, and not to stop sending the parameter adjustment request until the battery level of the mobile terminal is greater than or equal to the first power threshold.

Optionally, FIG. 5-3 is a block diagram illustrating yet another device 500 for reducing power consumption of a mobile terminal according to an exemplary aspect. As shown in FIG. 5-3, the device further includes:

a first restoring module 506 configured to:

when receiving a parameter restoring instruction sent by the access network device, restore the baseband-chip related communication parameter in the mobile terminal according to the parameter restoring instruction, the parameter restoring instruction being sent by the access network device when a preset time period has passed since the access network device sends the parameter adjustment instruction.

Alternatively, the parameter adjustment instruction includes a preset time period for instructing the restoration of the communication parameter, and when the preset time period has passed since the parameter adjustment instruction is received, the baseband-chip related communication parameter in the mobile terminal is restored.

Optionally, as shown in FIG. 5-2, the device further includes: a second sending module 507 configured to, when detecting that a battery level of the mobile terminal is greater than a second power threshold, send a parameter restoring request to the access network device, the second power threshold being larger than or equal to the first power threshold;

a second receiving module 508 configured to receive a parameter restoring instruction sent by the access network device, the parameter restoring instruction being sent by the access network device after the access network device receives the parameter restoring request.

Correspondingly, as shown in FIG. 5-2, the device may further include a second restoring module 509 configured to restore the baseband-chip related communication parameter in the mobile terminal according to the parameter restoring instruction.

Optionally, the parameter adjustment request includes at least one of batter level information of the mobile terminal and a communication parameter to be adjusted by the mobile terminal; and the baseband-chip related communication parameter in the mobile terminal includes at least one of a number of operable antennas, a carrier aggregation function, a multiple-input multiple-output parameter, a throughput rate of the mobile terminal and a communication protocol version.

Accordingly, in the device for reducing power consumption of a mobile terminal provided by the aspect of the present disclosure, the mobile terminal may send a parameter adjustment request to an access network device connected to the mobile terminal when receiving an instruction for reducing power consumption, and may adjust a baseband-chip related communication parameter according to a parameter adjustment instruction sent by the access network device, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figures 1, 6:
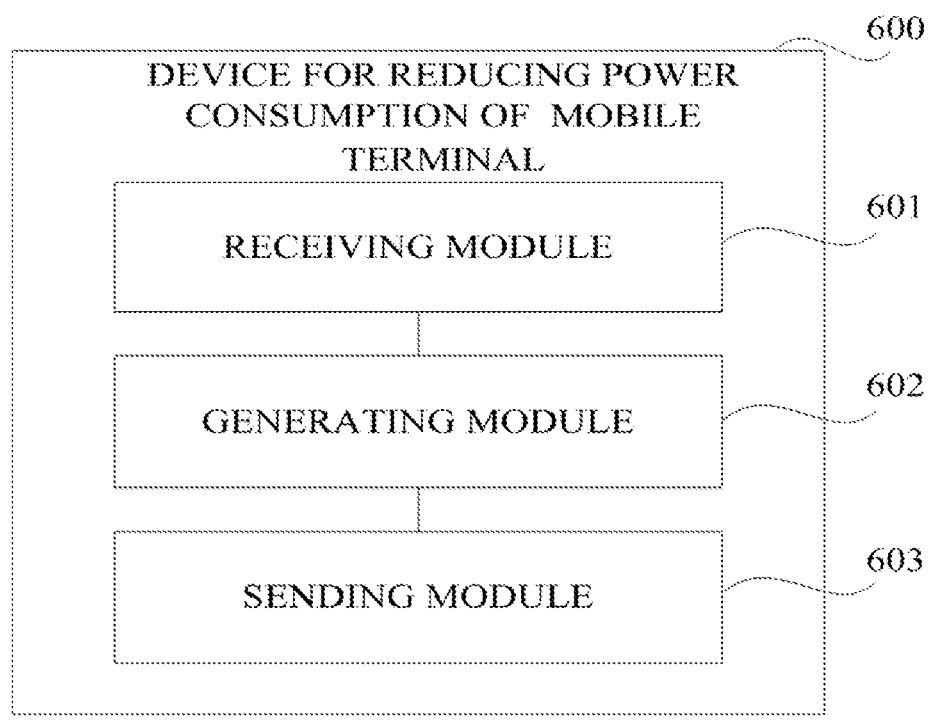
Figures 2, 6:
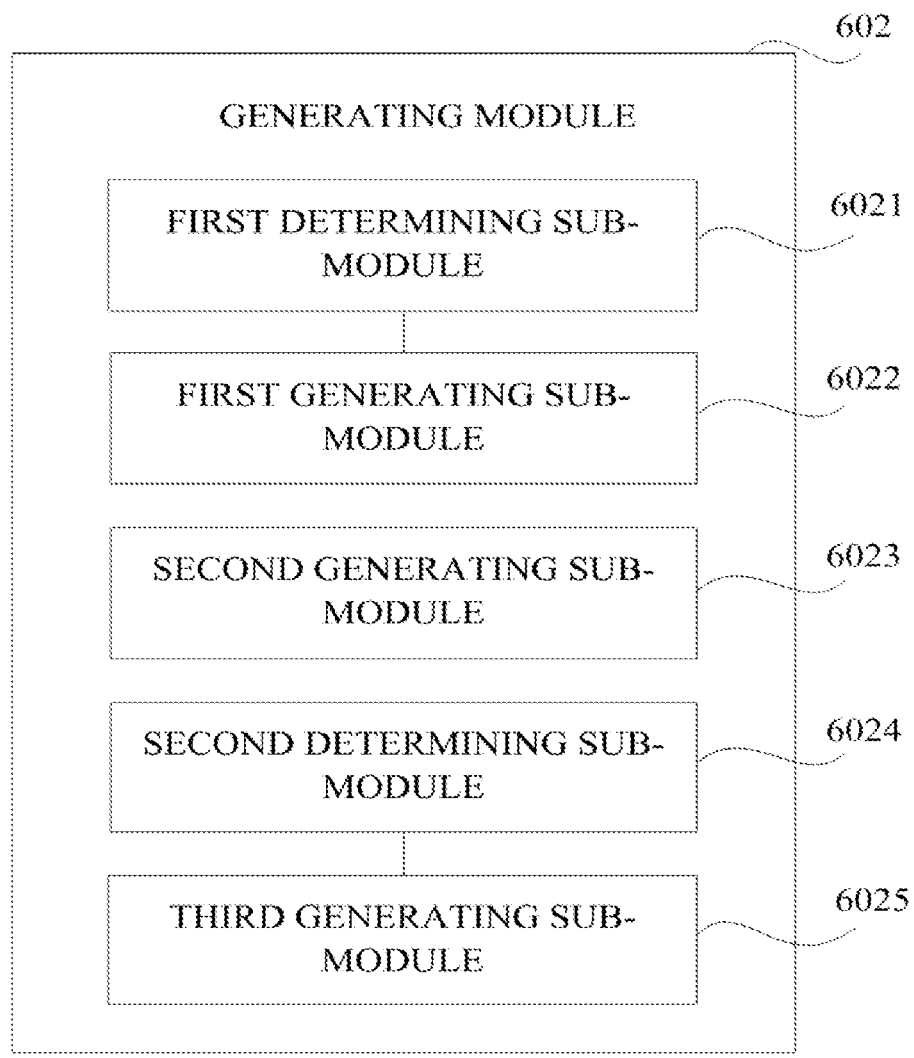
Figures 3, 6:
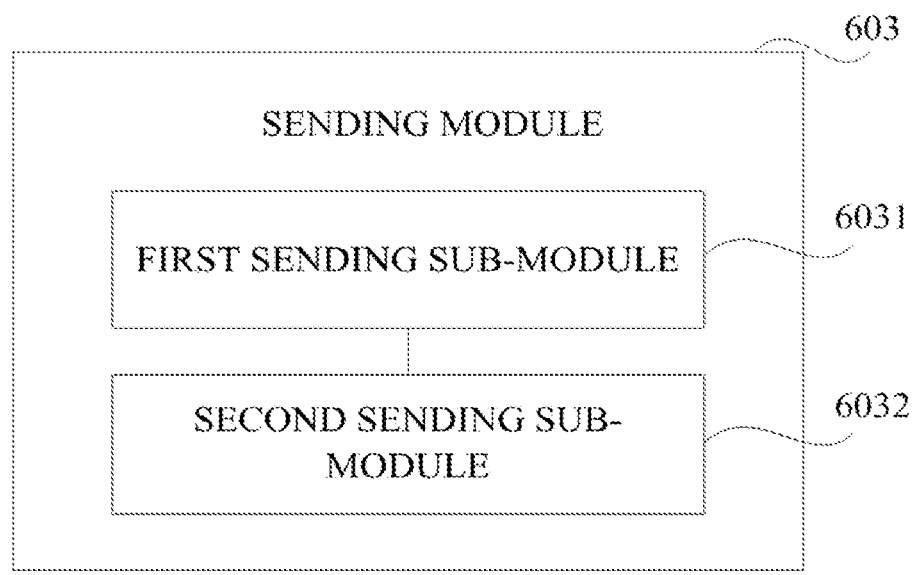

FIG. 6-1 is a block diagram illustrating still another device 600 for reducing power consumption of a mobile terminal according to an exemplary aspect. The device may be configured in the access network device 120 as shown in FIG. 1. As shown in FIG. 6-1, the device may include:

a receiving module 601 configured to receive a parameter adjustment request sent by a mobile terminal connected to the access network device;

a generating module 602 configured to generate a parameter adjustment instruction according to the parameter adjustment request, the parameter adjustment instruction including a communication parameter to be adjusted, and the communication parameter to be adjusted being a baseband-chip related communication parameter; and a sending module 603 configured to send the parameter adjustment instruction to the mobile terminal, the parameter adjustment instruction instructing the mobile terminal to adjust the baseband-chip related communication parameter in the mobile terminal, to reduce the power consumption of the mobile terminal.

Accordingly, in the device for reducing power consumption of a mobile terminal provided by the aspect of the present disclosure, when receiving a parameter adjustment request sent by a mobile terminal connected thereto, the access network device may send a parameter adjustment instruction to the mobile terminal. The mobile terminal may adjust a baseband-chip related communication parameter according to the parameter adjustment instruction, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Optionally, the parameter adjustment request includes: battery level information of the mobile terminal.

Correspondingly, FIG. 6-2 is a block diagram illustrating a generating module 602 according to an exemplary aspect. As shown in FIG. 6-2, the generating module 602 includes:

a first determining sub-module 6021 configured to, according to the battery level information, determine a communication parameter to be adjusted from baseband-chip related communication parameters in the mobile terminal, the number of the baseband-chip related communication parameters to be adjusted being negatively related to a battery level indicated by the battery level information; and a first generating sub-module 6022 configured to generate the parameter adjustment instruction according to the communication parameter to be adjusted.

Optionally, the receiving module 601 may include: a first receiving sub-module configured to receive parameter adjustment requests sent by multiple mobile terminals.

Correspondingly, as shown in FIG. 6-2, the generating module 602 further includes:

a second generating sub-module 6023 configured to sequentially generate a parameter adjustment instruction for each of the mobile terminals according to an order of battery levels of the multiple mobile terminals.

Correspondingly, FIG. 6-3 is a block diagram illustrating a sending module 603 according to an exemplary aspect. As shown in FIG. 6-3, the sending module 603 includes:

a first sending sub-module 6031 configured to sequentially send the parameter adjustment instruction to each of the mobile terminals according to the order of battery levels of the multiple mobile terminals.

Optionally, the parameter adjustment request includes: battery level information of the mobile terminal.

As shown in FIG. 6-2, the generating module 602 includes:

a second determining sub-module 6024 configured to, when a battery level indicated by the battery level information is less than a third power threshold, determine an adjustment frequency band, the adjustment frequency band allowing a communication quality higher than that of the current communication frequency band of the mobile terminal; and a third generating sub-module 6025 configured to generate the parameter adjustment instruction according to the adjustment frequency band, the parameter adjustment instruction also instructing the mobile terminal to adjust the communication frequency band of the mobile terminal to the adjustment frequency band.

Optionally, as shown in FIG. 6-3, the sending module 603 includes:

a second sending sub-module 6032 configured to:

send a parameter restoring instruction to the mobile terminal when a preset time period has passed since the parameter adjustment instruction is sent to the mobile terminal; or send a parameter restoring instruction to the mobile terminal when a parameter restoring request sent by the mobile terminal is received; or send a parameter restoring instruction to the mobile terminal when detecting that a battery level of the mobile terminal increases by a value greater than a preset threshold.

The parameter restoring instruction instructs the mobile terminal to restore the baseband-chip related communication parameter.

Accordingly, in the device for reducing power consumption of a mobile terminal provided by the aspect of the present disclosure, when receiving a parameter adjustment request sent by a mobile terminal connected thereto, the access network device may send a parameter adjustment instruction to the mobile terminal. The mobile terminal may adjust a baseband-chip related communication parameter according to the parameter adjustment instruction, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

With respect to the device in the foregoing aspect, a specific manner in which each module performs an operation has been described in detail in the aspects related to the method, and a detailed description of the specific manner will be omitted herein.

Figure 7:
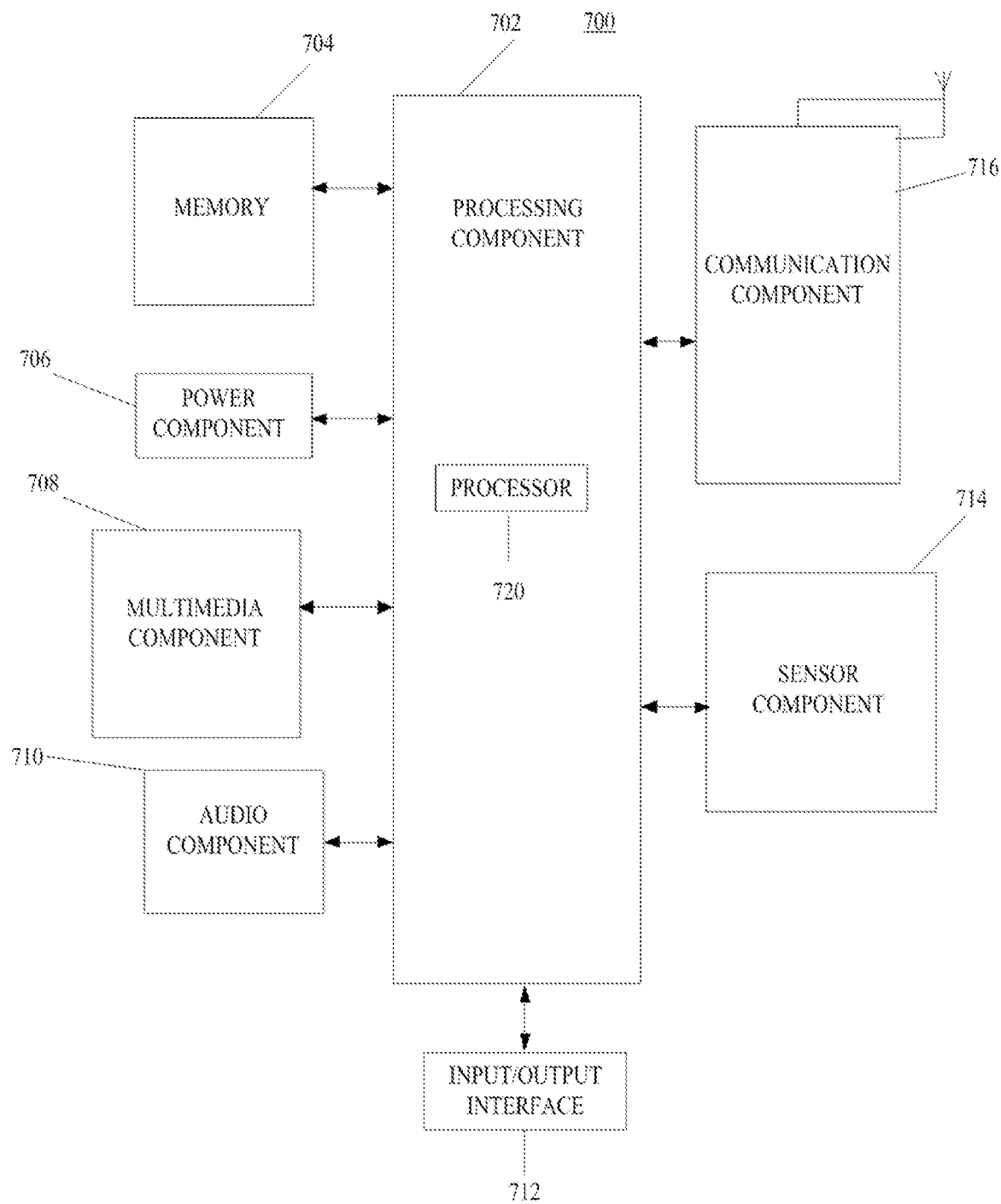
FIG. 7 is a block diagram illustrating a mobile terminal according to an exemplary aspect of the present disclosure.

FIG. 7 is a block diagram illustrating a mobile terminal 700 according to an exemplary aspect. For example, the mobile terminal 700 may be a mobile phone, a computer, a digital broadcast terminal, a messaging device, a gaming console, a tablet, a medical device, exercise equipment, a personal digital assistant, and the like.

Referring to FIG. 7, the mobile terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the mobile terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the mobile terminal 700. Examples of such data include instructions for any applications or methods operated on the mobile terminal 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the mobile terminal 700. The power component 706 may include a power management system, one or more power sources, and any other components associated with the generation, management, and distribution of power in the mobile terminal 700.

The multimedia component 708 includes a screen providing an output interface between the mobile terminal 700 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some aspects, the multimedia component 708 includes a front camera and/or a rear camera. The front camera and/or the rear camera can receive an external multimedia datum while the mobile terminal 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the mobile terminal 700 is in an operation mode, such as a call mode, a recording mode, and a voice recognition mode. The received audio signal may be further stored in the memory 704 or transmitted via the communication component 716. In some aspects, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the mobile terminal 700. For instance, the sensor component 714 can detect an open/closed status of the mobile terminal 700, relative positioning of components, e.g., the display and the keypad of the mobile terminal 700. The sensor component 714 can also detect a change in position of the mobile terminal 700 or a component of the mobile terminal 700, a presence or absence of user contact with the mobile terminal 700, an orientation or an acceleration/deceleration of the mobile terminal 700, and a change in temperature of the mobile terminal 700. The sensor component 714 may include a proximity sensor configured to detect the presence of nearby objects without any physical contact. The sensor component 714 may also include a light sensor, such as a CMOS or CCD image sensor, for use in imaging applications. In some aspects, the sensor component 714 may also include an accelerometer sensor, a gyroscope sensor, a magnetic sensor, a pressure sensor, or a temperature sensor.

The communication component 716 is configured to facilitate communication, wired or wirelessly, between the mobile terminal 700 and other devices. The mobile terminal 700 can access a wireless network based on a communication standard, such as WiFi, 2G; or 3G; or a combination thereof. In one exemplary aspect, the communication component 716 receives a broadcast signal or broadcast associated information from an external broadcast management system via a broadcast channel. In one exemplary aspect, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the mobile terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 704, executable by the processor 720 in the mobile terminal 700, for performing the above-described methods. For example, the non-transitory computer-readable storage medium may be a ROM, a RAM, a CD-ROM, a magnetic tape, a floppy disc, an optical data storage device, and the like.

Figure 8:
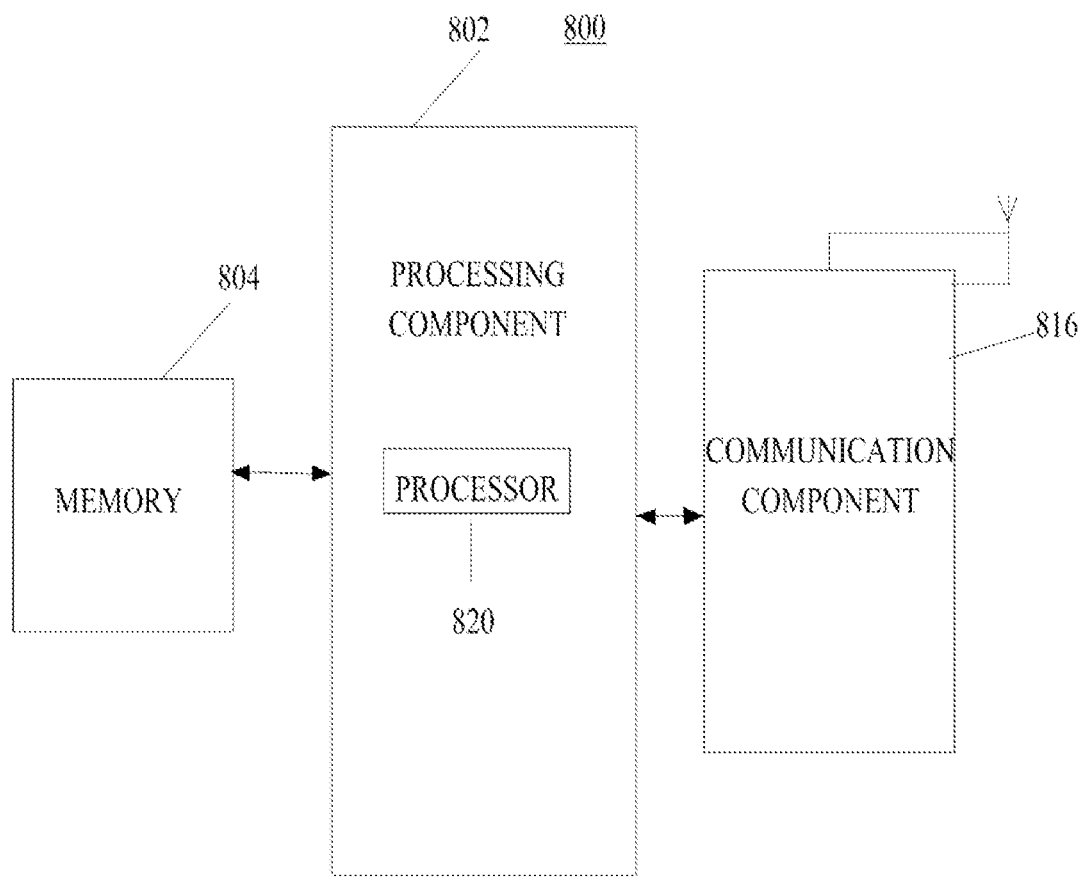
FIG. 8 is a block diagram illustrating an access network device according to an exemplary aspect of the present disclosure.

FIG. 8 is a block diagram illustrating an access network device 800 according to an exemplary aspect. For example, the access network device 800 may be an evolved base station, a radio network controller, or the like.

Referring to FIG. 8, the access network device 800 may include one or more of the following components: a processing component 802, a memory 804 and a communication component 816.

The processing component 802 typically controls overall operations of the access network device 800, such as the operations associated with data communications and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a communication module to facilitate the interaction between the communication component 816 and the processing component 802.

The memory 804 is configured to store various types of data to support the operation of the access network device 800. Examples of such data include instructions for any applications or methods operated on the access network device 800, exchanged data, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The communication component 816 is configured to facilitate communication, wired or wirelessly, between the access network device 800 and other devices. The access network device 800 can access a mobile terminal, such as a mobile phone, a computer or a tablet computer. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, there is also provided a non-transitory computer-readable storage medium including instructions, such as included in the memory 804, executable by the processor 820 in the access network device 800, for performing the above-described methods. For example, the non-transitory computer-readable storage medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for reducing power consumption of a mobile terminal, the method being applied to a mobile terminal, the method comprising:

sending a parameter adjustment request to an access network device connected to the mobile terminal in response to an instruction for reducing power consumption, wherein the parameter adjustment request includes battery level information of the mobile terminal;

receiving a parameter adjustment instruction sent by the access network device, wherein the parameter adjustment instruction includes a communication parameter to be adjusted, and the communication parameter to be adjusted is a baseband-chip related communication parameter, wherein the parameter adjustment instruction is generated at the access network device based on the parameter adjustment request by:

determining, based on the battery level information, the communication parameter to be adjusted from baseband-chip related communication parameters in the mobile terminal, wherein a number of the baseband-chip related communication parameters to be adjusted is inversely proportional to a battery level indicated by the battery level information; and generating the parameter adjustment instruction based on the communication parameter to be adjusted, and wherein the parameter adjustment instruction is generated at the access network device based on the parameter adjustment request further by:

when a battery level indicated by the battery level information is less than a third power threshold, determining an adjustment frequency band, wherein the adjustment frequency band allows a communication quality higher than that of the current communication frequency band of the mobile terminal; and generating the parameter adjustment instruction based on the adjustment frequency band, wherein the parameter adjustment instruction also instructs the mobile terminal to adjust the communication frequency band to the adjustment frequency band; and adjusting the baseband-chip related communication parameter in the mobile terminal based on the parameter adjustment instruction to reduce the power consumption of the mobile terminal.

2. The method according to claim 1, further comprising:
detecting a battery level of the mobile terminal; and
generating the instruction for reducing the power consumption when the battery level of the mobile terminal is less than a first power threshold, wherein sending the parameter adjustment request to the access network device comprises periodically sending the parameter adjustment request to the access network device while the battery level of the mobile terminal is less than the first power threshold, and continuing to send the parameter adjustment request until the battery level of the mobile terminal is greater than or equal to the first power threshold.

3. The method according to claim 2, wherein the parameter adjustment request includes the a communication parameter to be adjusted by the mobile terminal, and wherein the baseband-chip related communication parameter in the mobile terminal includes at least one of a number of operable antennas, a carrier aggregation function, a multiple-input multiple-output parameter, a throughput rate of the mobile terminal, and/or a communication protocol version.

4. The method according to claim 1, wherein after adjusting the baseband-chip related communication parameter in the mobile terminal, the method further comprises:

when receiving a parameter restoring instruction sent by the access network device, restoring the baseband-chip related communication parameter in the mobile terminal based on the parameter restoring instruction, wherein the parameter restoring instruction is sent by the access network device upon expiration of a preset time period from when the access network device sends the parameter adjustment instruction.

5. The method according to claim 1, wherein after adjusting the baseband-chip related communication parameter in the mobile terminal, the method further comprises:

upon expiration of a preset time period from when the parameter adjustment instruction is received, restoring the baseband-chip related communication parameter in the mobile terminal, wherein the preset time period is included in the parameter adjustment instruction and instructs the restoration of the communication parameter.

6. The method according to claim 1, wherein after adjusting the baseband-chip related communication parameter in the mobile terminal, the method further comprises:

when detecting that a battery level of the mobile terminal is greater than a second power threshold, sending a parameter restoring request to the access network device, wherein the second power threshold is larger than or equal to the first power threshold;

receiving a parameter restoring instruction sent by the access network device, wherein the parameter restoring instruction is sent by the access network device after the access network device receives the parameter restoring request; and restoring the baseband-chip related communication parameter in the mobile terminal based on the parameter restoring instruction.

7. The method according to claim 1, wherein the parameter adjustment request further includes the communication parameter to be adjusted by the mobile terminal, and wherein the baseband-chip related communication parameter in the mobile terminal includes at least one of a number of operable antennas, a carrier aggregation function, a multiple-input multiple-output parameter, a throughput rate of the mobile terminal, and/or a communication protocol version.

8. A method for reducing power consumption of a mobile terminal, the method being applied to an access network device, the method comprising:

receiving a parameter adjustment request sent by a mobile terminal connected to the access network device, wherein the parameter adjustment request includes battery level information of the mobile terminal;

generating a parameter adjustment instruction based on the parameter adjustment request, wherein the parameter adjustment instruction includes a communication parameter to be adjusted, and the communication parameter to be adjusted is a baseband-chip related communication parameter, wherein generating the parameter adjustment instruction based on the parameter adjustment includes:

determining, based on the battery level information, the communication parameter to be adjusted from baseband-chip related communication parameters in the mobile terminal, wherein a number of the baseband-chip related communication parameters to be adjusted is inversely proportional to a battery level indicated by the battery level information; and generating the parameter adjustment instruction based on the communication parameter to be adjusted, and wherein generating the parameter adjustment instruction based on the parameter adjustment further includes:

when a battery level indicated by the battery level information is less than a third power threshold, determining an adjustment frequency band, wherein the adjustment frequency band allows a communication quality higher than that of the current communication frequency band of the mobile terminal; and generating the parameter adjustment instruction based on the adjustment frequency band, wherein the parameter adjustment instruction also instructs the mobile terminal to adjust the communication frequency band to the adjustment frequency band; and sending the parameter adjustment instruction to the mobile terminal, wherein the parameter adjustment instruction instructs the mobile terminal to adjust the baseband-chip related communication parameter in the mobile terminal to reduce the power consumption of the mobile terminal.

9. The method according to claim 8, wherein receiving the parameter adjustment request sent by the mobile terminal comprises receiving parameter adjustment requests sent by multiple mobile terminals, wherein generating the parameter adjustment instruction based on the parameter adjustment request comprises sequentially generating a parameter adjustment instruction for each of the mobile terminals based on an order of battery levels of the multiple mobile terminals, and wherein sending the parameter adjustment instruction to the mobile terminal comprises sequentially sending the parameter adjustment instruction to each of the mobile terminals based on the order of battery levels of the multiple mobile terminals.

10. The method according to claim 8, wherein after sending the parameter adjustment instruction to the mobile terminal, the method further comprises sending a parameter restoring instruction to the mobile terminal upon expiration of a preset time period from when the parameter adjustment instruction is sent to the mobile terminal, wherein the parameter restoring instruction instructs the mobile terminal to restore the baseband-chip related communication parameter.

11. The method according to claim 8, wherein after sending the parameter adjustment instruction to the mobile terminal, the method further comprises sending a parameter restoring instruction to the mobile terminal when a parameter restoring request sent by the mobile terminal is received, wherein the parameter restoring instruction instructs the mobile terminal to restore the baseband-chip related communication parameter.

12. The method according to claim 8, wherein after sending the parameter adjustment instruction to the mobile terminal, the method further comprises sending a parameter restoring instruction to the mobile terminal when detecting that a battery level of the mobile terminal increased by a value greater than a preset threshold, wherein the parameter restoring instruction instructs the mobile terminal to restore the baseband-chip related communication parameter.

13. A mobile terminal, comprising:
a processor; and
a memory for storing instructions executable by the processor,
wherein the processor is configured to:
send a parameter adjustment request to an access network device connected to the mobile terminal in response to an instruction for reducing power consumption, wherein the parameter adjustment request includes battery level information of the mobile terminal;

receive a parameter adjustment instruction sent by the access network device, wherein the parameter adjustment instruction includes a communication parameter to be adjusted, and the communication parameter to be adjusted is a baseband-chip related communication parameter, wherein the parameter adjustment instruction is generated at the access network device based on the parameter adjustment request by:

determining, based on the battery level information, the communication parameter to be adjusted from baseband-chip related communication parameters in the mobile terminal, wherein a number of the baseband-chip related communication parameters to be adjusted is inversely proportional to a battery level indicated by the battery level information; and generating the parameter adjustment instruction based on the communication parameter to be adjusted, and wherein the parameter adjustment instruction is generated at the access network device based on the parameter adjustment request further by:

when a battery level indicated by the battery level information is less than a third power threshold, determining an adjustment frequency band, wherein the adjustment frequency band allows a communication quality higher than that of the current communication frequency band of the mobile terminal; and generating the parameter adjustment instruction based on the adjustment frequency band, wherein the parameter adjustment instruction also instructs the mobile terminal to adjust the communication frequency band to the adjustment frequency band; and adjust the baseband-chip related communication parameter in the mobile terminal based on the parameter adjustment instruction to reduce the power consumption of the mobile terminal.

14. The mobile terminal according to claim 13, wherein the processor is further configured to:

detect a battery level of the mobile terminal; and
generate the instruction for reducing the power consumption when the battery level of the mobile terminal is less than a first power threshold, wherein, when sending the parameter adjustment request to the access network device, the processor is further configured to:

periodically send the parameter adjustment request to the access network device while the battery level of the mobile terminal is less than the first power threshold, and continuing to send the parameter adjustment request until the battery level of the mobile terminal is greater than or equal to the first power threshold.

15. The mobile terminal according to claim 13, wherein after adjusting the baseband-chip related communication parameter in the mobile terminal, the processor is further configured to:

when receiving a parameter restoring instruction sent by the access network device, restore the baseband-chip related communication parameter in the mobile terminal based on the parameter restoring instruction, wherein the parameter restoring instruction is sent by the access network device upon expiration of a preset time period from when the access network device sends the parameter adjustment instruction.

16. The mobile terminal according to claim 13, wherein after adjusting the baseband-chip related communication parameter in the mobile terminal, the processor is further configured to:

upon expiration of a preset time period from when the parameter adjustment instruction is received, restore the baseband-chip related communication parameter in the mobile terminal, wherein the preset time period is included in the parameter adjustment instruction and instructs the restoration of the communication parameter.

17. The mobile terminal according to claim 13, wherein after adjusting the baseband-chip related communication parameter in the mobile terminal, the processor is further configured to:

when detecting that a battery level of the mobile terminal is greater than a second power threshold, send a parameter restoring request to the access network device, wherein the second power threshold is larger than or equal to the first power threshold;

receive a parameter restoring instruction sent by the access network device, wherein the parameter restoring instruction is sent by the access network device after the access network device receives the parameter restoring request; and restore the baseband-chip related communication parameter in the mobile terminal based on the parameter restoring instruction.

18. The mobile terminal according to claim 13, wherein the parameter adjustment request further includes the communication parameter to be adjusted by the mobile terminal, and wherein the baseband-chip related communication parameter in the mobile terminal includes at least one of a number of operable antennas, a carrier aggregation function, a multiple-input multiple-output parameter, a throughput rate of the mobile terminal, and/or a communication protocol version.

* * * * *